Feb. 4, 1930.  G. E. STOLTZ  1,745,873
CONTROL SYSTEM
Filed Aug. 11, 1927

INVENTOR
Glenn E. Stoltz
BY
Wesley G. Carr
ATTORNEY

Patented Feb. 4, 1930

1,745,873

UNITED STATES PATENT OFFICE

GLENN E. STOLTZ, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed August 11, 1927. Serial No. 212,273.

This invention relates generally to systems of control and more particularly to systems for controlling the operation of metal cutting machines.

The object of the invention, generally stated, is to provide a control system for metal cutting machines that shall be simple, accurate and positive in operation and readily and economically manufactured and installed.

A more specific object of the invention is to provide for setting the stock to be worked in metal cutting machines in predetermined positions to assure that it is cut in the desired lengths and shapes.

Another object of the invention is to provide for automatically setting metal cutting machines in operation when the stock is in the proper position to be worked.

A further object of the invention is to provide for preventing the operation of a metal cutting machine until the stock is in the proper position to be worked.

Figure 1:
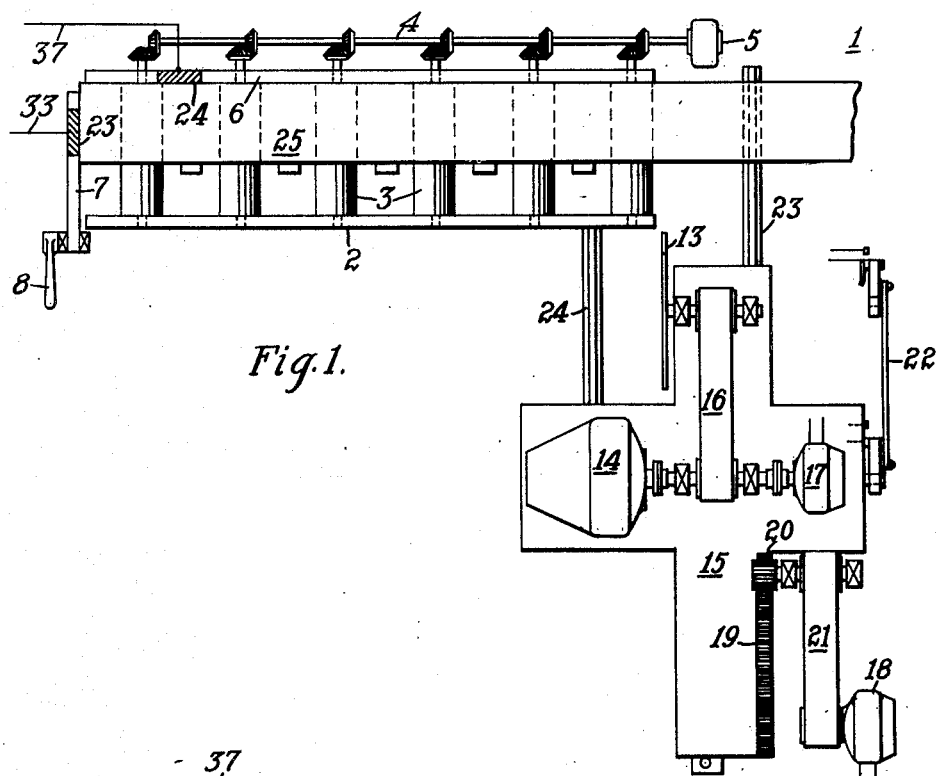
Figure 2:
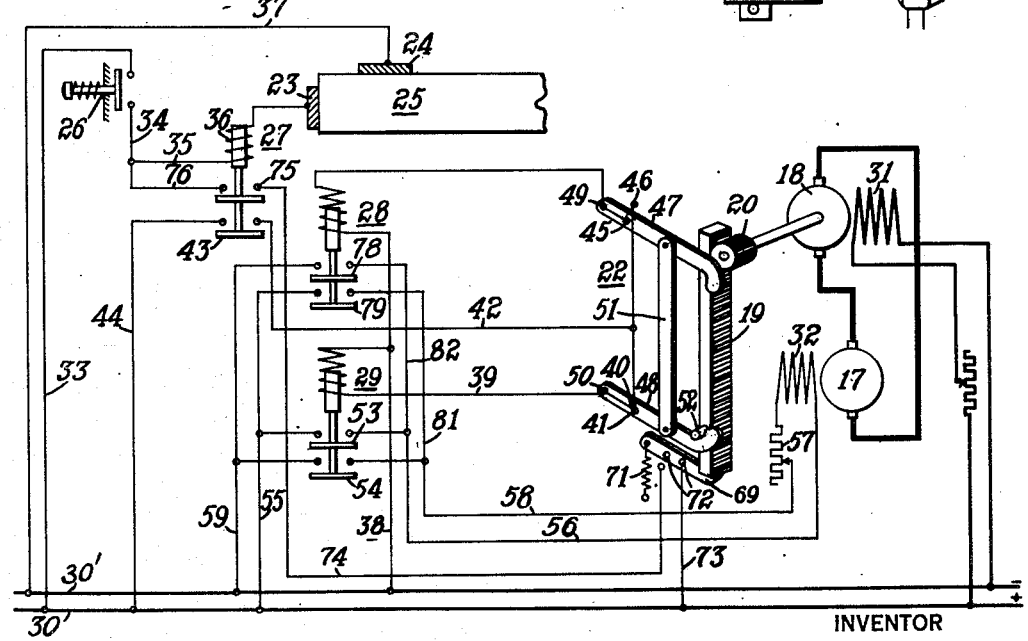

For a fuller understanding of the objects of the invention, reference should be had to the following detailed description taken in connection with the accompanying drawing, in which, Figure 1 shows diagrammatically a metal cutting machine constructed in accordance with this invention, and, Fig. 2 is a diagram of the control system utilized in conjunction with the cutting machine.

Referring now to Fig. 1, the metal cutting machine illustrated and which is known in the trade as a hot or cold saw, comprises the usual roll table 2 provided with a plurality of feed rolls 3. The rolls 3 may be driven in any approved manner and for convenience in illustration, a shaft 4 extending longitudinally of the table is shown and a number of bevel gears are mounted on it and disposed to mesh with bevel gears provided on the ends of the rolls. The operation of the shaft 4 may be effected by a motor 5.

The movement of the stock through the mill is controlled by a stationary guide 6 and a movable gauge stop 7. As shown, the guide extends longitudinally of the roll table and so the stock slides along it as it is fed into the machine. The stop 7 which in this construction is disposed for manual operation by means of the lever 8 is located at the end of the table to engage the ends of the stock to stop it when the operator desires to make a cut.

In order to cut the stock, a rotary saw 13 which is driven by a motor 14 is provided. The saw 13 and the motor 14 are mounted on a carriage 15 which may be moved relative to the stock for performing cutting operations.

The actuation of the carriage 15 is effected by a motor 18 to which it is connected by a rack and pinion drive. As shown, the rack 19 is mounted on the carriage 15 and meshes with the pinion 20 which is driven by the motor 18 through a belt 21.

The change of direction of the movements of the carriage 15 may be effected by reversing the motor 18. The reversal of the motor may be accomplished in any well known manner such as by means of generator field control and a limit switch 22 provided for limiting the movements of the carriage, as will be explained hereinafter. In order to prevent the advancing of the saw carriage to make a cut before the metal is properly positioned, the control circuit for controlling the operation of the motor 18 is arranged in such manner that it cannot be closed before the stock is in position.

The control of the operating circuit of the carriage motor 18 is effected by a plurality of contact members 23 and 24 which are arranged to be bridged by a portion of the metal stock 25 when it is properly positioned on the roll table. Therefore, it is evident that the contact members 23 and 24 can readily be utilized for controlling the various circuits.

In the interest of simplicity in illustration, the arrangement or connection of the contact members 23 and 24 as shown in Fig. 2 is such as to operate in series with a push-button switch 26 to control a relay 27 which in turn controls the energizing circuit for the generator-field-reversing contactors 28 and 29. However, it is to be understood that various other schemes could be used.

The specific illustration, as shown in Fig. 1, shows the contact member 23 as being a part of the movable stop 7 and the contact member 24 as being a part of the stationary guide 6. These contact members may take any desired form so long as the metal used in their construction has electric current carrying properties and is sufficiently strong to withstand the shocks which may be imposed upon them in the procedure of positioning the stock upon the rolls.

In order that the objects of the invention may be more readily understood, the operation of the machine will now be explained. The control of the machine may be effected by means of any simple circuit such as shown in Fig. 2. A direct current power source which may be represented by the conductors 30 and 30' is provided for energizing the shunt field winding 31 of the carriage motor 18 and the shunt field winding 32 of the generator 17 and also for actuating the various control relays.

Assuming that the saw actuating motor 14 is operating and that the metal stock 25 is in the proper position to be cut and that it is bridging the contact members 23 and 24, and that the push button switch 26 is closed by the operator, then an energizing circuit for the control relay 27 is established which extends from the line conductor 30, through conductor 33, through switch 26, conductors 34 and 35, coil 36, contact members 23 and 24 bridged by the stock, and conductor 37, to the line conductor 30'.

The relay 27 is closed establishing an energizing circuit for the generator-field-reversing contactors 28 and 29, which may be traced from line conductor 30, through conductor 38, through the actuating coil of the reversing contactor 29, conductor 39, contact members 40 and 41 of the limit switch 22, conductor 42, movable contact member 43 of relay 27, and conductor 44 to the line conductor 30. The reversing contactor 29 will be closed since the limit switch 22 stands in its lower position, however, if the limit switch 22 has been actuated in such manner as to close the contact members 45 and 46, the field reversing contactor 28 would have been operated.

The limit switch 22 as here shown comprises a pair of pivotally mounted arms 47 and 48, secured at points 49 and 50 and held in substantially parallel positions by a connecting link 51. A pin 52 is provided on the rack 19 and is disposed to engage with the extended portions of arms 47 and 48 to cause their movement, in a direction to effect the closure of either pair of contact members 40 and 41, or 45 and 46, which are associated therewith. It will be noted that as the rack 19 and pin 52 are carried to the forward position by the movement of the carriage 15, the limit switch 22 remains in the closed position until the arm 47 is engaged by the pin 52, whereupon contact members 45 and 46 are closed simultaneously with the opening of contact members 40 and 41.

Upon the closure of the two pairs of contact members 53 and 54 of contactor 29, an energizing circuit for the shunt field winding 32 of the generator 17 is established which may be traced from the line conductor 30, through conductor 55, contact member 53, conductor 56, field coil 32, resistor 57, conductor 58, contact member 54, and conductor 59 to the line conductor 30'. Since the saw actuating motor 14 and the saw are in operation the generator 17 directly connected to the motor is running full speed and its voltage builds up to a value limited by the variable resistor 57 when the shunt field circuit is closed. The carriage actuating motor 18 is connected in a closed circuit with the generator 17, and therefore it is energized when the generator field winding is closed and it moves the carriage 15 forward.

As the rack 19 is moved forward it is disengaged from the pawl 69, and the pawl is biased to its lower position by the spring 71 to bridge the contact members 72 to establish a circuit for the control relay 27. The relay holding circuit may be traced from the line conductor 30, through conductor 73, contact members 72, conductor 74, contact members 75 of relay 27, conductors 76 and 35, coil 36, contact members 23 and 24 bridge by the metal stock 25, and conductor 37 to the line conductor 30'. It will be seen that the push button switch 26 has been shunted and thus is no longer required for completing the energizing circuit for the control relay 27, and can be released by the operator immediately after the carriage has started to move forward.

When the rack 19 reaches the full forward position the protruding pin 52 engages with an extended portion of arm 47 and actuates it counter-clockwise about its pivot point 49. The contact members 45 and 46 are moved into engagement to establish an energizing circuit for the actuating coil of the contactor 28. At the same time, the contact members 40 and 41 are disengaged to interrupt the energizing circuit for the actuating coil of contactor 29. The actuating coil of contactor 28 when energized operates the contactor 28 to close contact members 78 and 79 to establish a second energizing circuit for the shunt field coil 32 of the generator 17 which extends from the line conductor 30, through conductor 55, movable contact member 79, conductors 81 and 58, resistor 57, field coil 32, conductor 56 and 82, movable contact members 78, and conductor 59 to the line conductor 30'. It will be observed that this circuit reverses the polarity of the field coil 32, thus causing a reversal of the generator voltage. The generator 17 being connected in a closed circuit with the motor 18 will automatically effect a reversal in the direction of rotation of the motor. The saw carriage is brought to rest and moved in the opposite direction.

The motor returns the saw carriage 15 to the starting position. The rack 19 during the return movement of the carriage actuates the pawl 69 and interrupts the holding circuit for the relay 27 which drops out and interrupts the energizing circuits for the contactors 28 and 29 thereby effecting a deenergization of the generator and brings the motor 18 to a stop.

Before operation can be resumed, the push-button switch must be depressed by the operator, which is to say that the control scheme is semi-automatic, for if the switch 26 is being held down, the advancing stock upon arriving at a position where it bridges the contact members 23 and 24 would automatically set the saw carriage in motion.

Also, by the elimination of the push-button switch 26, the cutting operation could be accomplished automatically, the control depending solely upon the bridging of the contact members 23 and 24 by the advancing metal stock for its operation.

Since certain changes may be made in the above described construction and different embodiments of the invention may be made without departing from the scope thereof, it is intended that all matter contained in the above description, or shown in the accompanying drawings shall be interpreted in an illustrative and not in a limiting sense.

I claim as my invention:

1. In metal-cutting machines for cutting metal stock, in combination, means for positioning the stock to be cut, means for cutting the stock, and a circuit for controlling the operation of the stock-cutting means, a plurality of contact members connected in the control circuit and disposed to be bridged by the stock when in position to be cut, said stock-cutting means being dependent for its operation on the bridging of the contact members by the stock.

2. In metal-cutting machines for cutting metal stock, in combination, means for positioning the stock, means for cutting the stock, a circuit for controlling the operation of the cutting means, and a plurality of electrical-contact members arranged in a predetermined position to be bridged by the metal stock when said stock is in position to be cut, said contact members being connected in the control circuit to govern the operation of the metal-cutting means to prevent its functioning prior to the setting of the stock in position.

3. In metal-cutting machines for cutting metal stock, in combination, means for positioning the stock, means for cutting the stock, means for actuating the cutting means, electrically-operable means for governing the actuating means, a circuit for energizing said electrically operable means, contact members connected in said circuit and disposed to be bridged by the stock in a position to be cut, thereby to set the actuating means in operation only when the stock is in position.

4. In metal-cutting machines for cutting metal stock, in combination, means for positioning the stock, means for cutting the stock, a motor for actuating the cutting means, a plurality of electrical-contact members disposed to be bridged by the metal stock, a motor circuit controlled by the contact members and stock, said motor being disposed to effect relative movement of the stock and cutting means to perform a cutting operation, the motor being started by the stock being moved into engagement with the contacts.

5. In a metal-cutting machine for cutting metal stock, in combination, means for positioning the stock, a motor-driven saw for cutting the stock into lengths, a motor driven saw carriage for carrying the saw, a control circuit for said motor-driven saw carriage, and a plurality of electrical contacts disposed to be bridged by a portion of the metal stock when the stock is properly positioned to be cut, the said contacts being disposed to govern the operation of said motor-control circuit.

6. In metal-cutting machines for cutting metal stock, in combination, a roll table for positioning the stock, a guide member carried by the roll table for aligning the stock, a stop-gage member for limiting the length of stock to be cut, a metal contact member supported by and insulated from said guide member, a similar contact member supported by and insulated from said stop-gage member, a motor-actuated cutting saw, a motor-actuated carriage for supporting the saw, and a control circuit for said motor-actuated carriage in which said contact members are connected in series relation and so disposed as to complete the said circuit by the bridging of said contact members by the metal stock as it is moved into position, thereby to cause the carriage-actuating motor to position the saw to perform a cutting operation.

7. In a metal-cutting machine for cutting metal stock, in combination, means for feeding the stock to be cut, means for cutting the stock, means for effecting movement of the cutting means to perform cutting operations, a control circuit for governing the movement of the cutting means toward the stock, contact members connected in the circuit to cooperate in the proper positioning of the stock for cutting, said circuit being closed in response to the bridging of the contact members by the stock.

In testimony whereof, I have hereunto subscribed my name this 3rd day of August, 1927.

GLENN E. STOLTZ.